3,631,017
AFTER-TREATING POLYETHYLENE IN A SHEARING UNIT

August Rettig, Ludwigshafen, Wolfgang Ball, Mannheim, Johann Zizlsperger, Frankenthal, and Friedrich Urban and Helmut Pfannmueller, Limburgerhof, Germany, assignors to Badische Anilin- & Soda-Fabrik Aktiengesellschaft, Ludwigshafen am Rhine, Germany
No Drawing. Filed Jan. 27, 1970, Ser. No. 6,303
Claims priority, application Germany, Jan. 31, 1969,
P 19 04 739.3
Int. Cl. C08f 27/00, 27/28
U.S. Cl. 260—94.9    4 Claims

ABSTRACT OF THE DISCLOSURE

A method of after-treating high-pressure polyethylene in a shearing unit, wherein the high-pressure polyethylene is introduced into the shearing unit at 200° to 300° C. and a viscosity of $5 \times 10^3$ to $1 \times 10^5$ poises and subjected to a shearing gradient, the shearing surfaces contacting the polyethylene melt being heated to a temperature which is at least as high as that of the polyethylene melt and the polyethylene melt being sheared at such a shearing speed that the product of shearing speed and residence time in the shearing zone is equal to $5 \times 10^2$ to $5 \times 10^4$.

---

This invention relates to a method of after-treating polyethylene in a shearing unit, particularly in a screw extruder, wherein the polyethylene obtained by a high-pressure process is introduced into the shearing unit in the absence of atmospheric oxygen and in molten form at a temperature of 200° to 300° C. and a viscosity of $5 \times 10^3$ to $1 \times 10^5$ poises and is subjected to a shearing gradient.

In the production of semi-finished goods and shaped articles from polyethylene melts or granules use is preferably made of polymers having good flow properties and thermal stability at the usual processing temperatures of over 200° C. Semi-finished goods made from these polymers, such as tubular film, tubes and sheets, or finished articles, such as bottles, household utensils and toys, must have good mechanical strength, smooth surfaces showing optimum luster and, in some cases, a high degree of transparency. They should be resistant to stress corrosion cracking due to atmospheric influences or wetting agents (surface-active agents).

In the manufacture of polyethylene differences in residence times of the reaction mixture in the reactor and the following separators and differences in the polymerization temperatures in the individual sections of the polymerization plant, for example a tube reactor, often cause portions of the polyethylene to differ from the major portion in molecular weight and molecular weight distribution and thus in their rheological and, in some cases, optical properties. Moreover, such melts may contain crosslinked polyethylene particles known as specks. Shaped articles made from such melts are usually useless or have considerably reduced sales value.

Attempts have been constantly made to overcome these faults in the polyethylene melt during the polymerization process itself. However, as yet no high-pressure polyethylene manufacturing process has been successfully developed in which all of the propertes of the polyethylene product are optimum. Moreover, quality improvements gained by subsequent treatments have been partial only.

Thus it is known to subject the polyethylene melt to a shearing gradient in homogenizing plants with the intention of breaking up the unwanted portions and causing them to be distributed or dissolved in the melt. Previous attempts were aimed at achieving high shearing stresses in the shearing zones of the homogenizing units. To this end the shearing surfaces coming into contact with the polyethylene melt were cooled. This led to a rise in the energy consumption of the homogenizing units but only because of the increased resistance in the gap due to the cooling. Thus the driving energy was converted to heat in a very narrow zone with the result that the desired effect was not obtained.

Polyethylene granules were preferably homogenized, therefore, in order that the homogenization could be carried out at relatively low temperatures. However, such granules entrain adsorbed atmospheric oxygen into the homogenize, and this oxygen reacts with the polyolefin to produce cross-linked substances as well as evil-smelling degradation products. Although these portions are effective as lubricants during subsequent processing, they do, in fact, cause increased blocking, for example in films.

It has also been proposed to convert polyethylene to granules or finished articles immediately on leaving the separator of a high-pressure polyethylene polymerization process, that is, without any intermediate treatment. Practical experience shows, however, that the surfaces of the finished shaped articles produced by this method, particularly extrudates, are streaky and speckled and frequently rough and scaly.

In another known process an attempt is made to produce granules for the manufacture of shaped articles having optimum properties and, in particular, devoid of marks and nodules in their surfaces, by cooling the polyethylene melt to temperatures between 150° and 190° C., carrying out intensive stirring at this temperature and then extruding the melt to form granules. It is intended that the melt should be stabilized at the same time.

A disadvantage of this method is that, on account of the poor thermal conductivity of the polyethylene melt, very large heat exchanging surfaces must be provided and very long residence times used in order to cool the melt from the polymerization temperature (250°–350° C.) to below 190° C. Layers will always be formed which differ in viscosity and thus in flow characteristics and which will thus have different residence times. This will again lead to additional specks and streaks being formed.

Another disadvantage occuring in the processing of polyethylene melts or granules according to prior art methods is caused by the presence of ethylene in the melt. Shaped articles made from insufficiently degassed polyethylene frequently exhibit bubbles and foamed areas.

It is thus an object of the invention to provide a method of after-treating polyethylene which does not have the aforementioned drawbacks and produces a polyethylene which remains substantially free of bubbles and inclusions of cross-linked portions or degradation products when converted to semi-finished goods or shaped articles and which consequently has improved optical, mechanical and rheological properties compared with polyethylenes treated by prior art methods.

According to the invention this object is achieved, in a method of after-treating polyethylene in which the polyethylene obtained from a high-pressure process is introduced, in the absence of atmospheric oxygen and in the molten state, into the shearing unit at a temperature of 200° to 300° C. and a viscosity of $5 \times 10^3$ to $1 \times 10^5$ poises where it is subjected to a shearing gradient, by heating the shearing surfaces which contact the polyethylene melt to a temperature which is equal to or higher than the temperature of the polyethylene melt entering the shearing unit and by causing the polyethylene melt to be sheared at a shearing speed of $1 \times 10^3$ to $1 \times 10^5$ sec.$^{-1}$, the product of shearing speed and residence time in the shearing zone being from $5 \times 10^2$ to $5 \times 10^4$.

In this way it is ensured that, although the polyethylene melt is subjected to only a relatively low shearing gradient, the energy taken up by the melt is at least 0.1 kwh. per kg. of melt due to the use of relatively high shearing speeds and adequate residence times. Heating the shearing surfaces which contact the melt has the additional effect of causing the melt to pass through the shearing zone essentially in plug flow with the result that all of the component streams passing through the shearing zone have approximately equal residence times. The spacing of the shearing surfaces defining the shearing zone or zones is determined by the nature of the polyethylene used and by the througput. Suitable homogenizing units are for example screw extruders having one or more shearing zones between the feed sections, which zones may be in the relatively long form of annular gaps.

We have also found that polyethylene may be converted to particularly high-quality semi-finished goods or moldings, that is, goods or molding having high luster and good transparency combined with good mechanical properties, when the polyethylene melt to be subjected to the shearing gradient contains, on entering the shearing unit, ethylene in an amount of from 0.01 to 0.5% by weight based on the total weight of the melt. Since the ethylene contained in the melt will react with radicals contained in the melt in the shearing zone, the re-formation of undesirably long chains of molecules or cross-linking of portions of the polyethylene melt will be avoided and optimum mechanical and optical properties will be imparted to the polyethylene.

In addition, we have found that the ethylene still present in the polyethylene melt after shearing continues to react with the radicals in the melt if the ingress of atmospheric oxygen is still prevented. The reaction proceeds especially uniformly throughout the entire melt when the melt is prevented from losing heat, which may be achieved, for example, by heating not only the shearing surfaces of the shearing unit but also the walls of the tanks and pipes to the temperature of the melt or higher.

The main advantage gained by using the method of the invention as compared with previously employed methods is that the treated polyethylene has improved processing characteristics combined with better optical properties, increased mechanical strength and improved resistance to stress corrosion cracking. Other advantages of the method of the invention will be apparent from the following examples.

EXAMPLE 1 (Prior Art)

Polyethylene melt having a density of 0.918, a melt index MI of 0.25 and an ethylene content of 0.12% by weight and coming from the tubular reactor of a high-pressure polyethylene polymerization plant is fed at a temperature of 250° C. and a pressure of 4 atmospheres gauge to a gear pump which extrudes the melt, with no intermediate treatment, through the circular die of a film blowing apparatus, at a pressure of 100 atmospheres, to form tubular film having a thickness of 200μ. Polyethylene processed by this method gives tubular film having a rough and scaly surface. The melt index MI of this tubular film is 0.5 and its impact resistance is 1,200 cm. kg./cm.$^2$. Low molecular weight constituents of the melt begin to be deposited on the die lips after a few minutes.

EXAMPLE 2

Polyethylene melt having the same chemical and physical properties as in Example 1 and obtained in the same polymerization plant is fed, under the same conditions as in Example 1, to a single-screw extruder whose screw comprises two feed sections with a friction roller disposed therebetween, the shearing speed of the friction roller being 1,250 sec.$^{-1}$ in the shearing zone, the screw diameter being 120 mm., the friction roller diameter 117 mm., the residence time of the melt in the shearing zone 2 seconds and the rotary speed of the roller 300 r.p.m. The tubular film extruded from the melt has a dispersion value of 40 and a gloss value of 85. The melt index MI is 0.15 and the impact resistance 1,800 cm.kg./cm.$^2$.

EXAMPLE 3

Polyethylene melt having a density of 0.918, a melt index MI of 0.25 and an ethylene content of 0.2% by weight is fed by a screw extruder, in which the screw has feed and shearing zones kept at a temperature of 260° C., to a film blowing plant through a jacketed pipe of 100 mm. internal diameter and 25 m. in length, said pipe being maintained at 250° C. At a throughput of 80 kg./hr. the residence time in the pipe is 2.23 hours and the velocity of flow is 11.1 m./hr. This gives a shearing speed of 222 hours.$^{-1}$.

Tubular film extruded from this melt has a dispersion value of 30, a gloss value of 95, a melt index MI of 0.16 and an impact resistance of 2,200 cm.kg./cm.$^2$.

We claim:

1. A method of after-treating polyethylene in a shearing unit of a screw press to improve its optical properties, increase its mechanical strength, and improve its resistance to stress corrosion cracking which comprises introducing polyethylene obtained from a high-pressure process in the absence of and without earlier contact by atmospheric oxygen and in the molten stage directly into a shearing unit at a temperature of 200° to 300° C. and a viscosity of $5 \times 10^3$ to $1 \times 10^5$ poises, therein subjecting the polyethylene, containing monomeric ethylene in an amount of from 0.01 to 0.5% by weight with reference to the total weight of the melt, to a shearing gradient, the shearing surfaces of said unit which contact the polyethylene melt being heated to a temperature which is at least as high as the temperature of the polyethylene melt entering the shearing unit, and causing the polyethylene melt to be sheared at a shearing speed of $1 \times 10^3$ to $1 \times 10^5$ sec.$^{-1}$, the product of shearing speed and residence time being from $5 \times 10^2$ to $5 \times 10^4$ to produce a polyethylene of substantially lower melt index the monomeric ethylene contained in the polyethylene entering the shearing unit reacting with the polymer molecules of the melt during the shearing step.

2. A method as claimed in claim 1 wherein the shearing energy applied is at least 0.1 kwh./kg. of melt.

3. A process as claimed in claim 1 wherein said shearing unit embodies a friction roller having its roller surface maintained at a temperature at least equal to the temperature of the polyethylene melt entering the shearing unit.

4. A process as claimed in claim 3, and homogenizing the polyethylene melt prior to entry into the shearing unit and after discharge from the shearing unit in sections of a screw extruder.

References Cited

UNITED STATES PATENTS

| 2,935,502 | 5/1960 | Reding | 260—94.9 |
| 3,412,080 | 11/1968 | Smith et al. | 260—94.9 |

JOSEPH L. SCHOFER, Primary Examiner

W. F. HAMROCK, Assistant Examiner

U.S. Cl. X.R.

260—88.25, 93.7